Sept. 20, 1966

R. P. DURKEE 3,273,405

CONTROL APPARATUS

Filed June 19, 1961

INVENTOR.
ROGER P. DURKEE
BY Roger W. Jensen
ATTORNEY

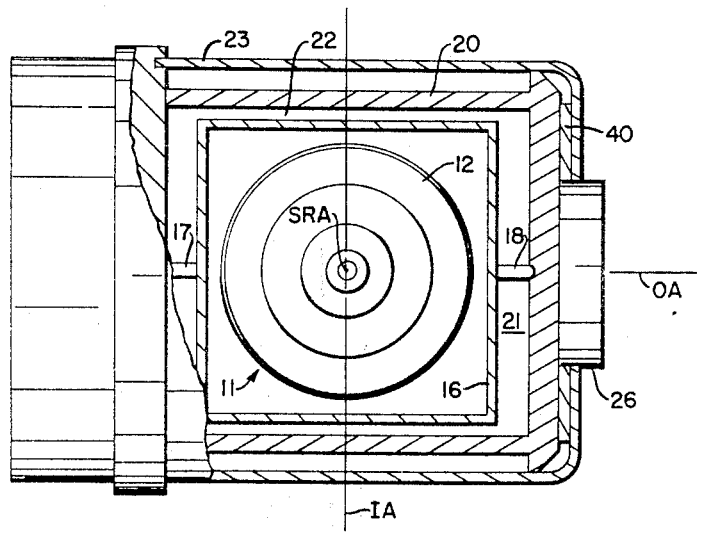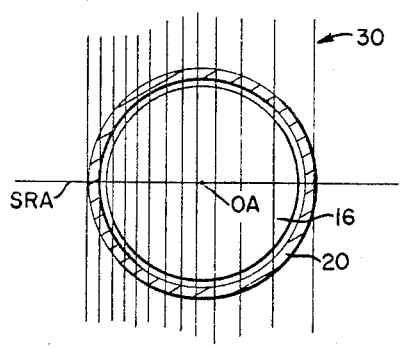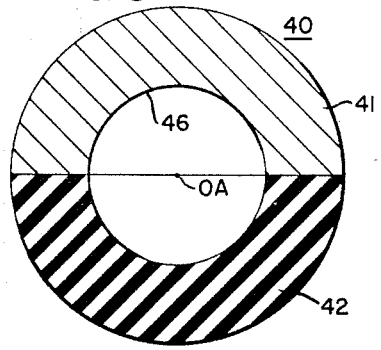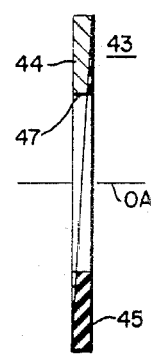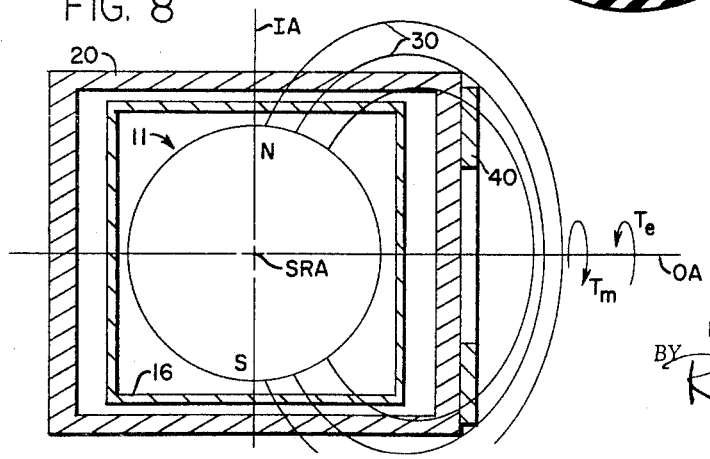

United States Patent Office 3,273,405
Patented Sept. 20, 1966

3,273,405
CONTROL APPARATUS
Roger P. Durkee, Hopkins, Minn., assignor to Honeywell
Inc., a corporation of Delaware
Filed June 19, 1961, Ser. No. 118,011
8 Claims. (Cl. 74—5.7)

This invention relates to gyroscopes and more particularly to means of obtaining a more accurate gyroscope.

The present day gyroscope is a highly refined and accurate inertial sensing instrument capable of being utilized in inertial guidance systems. The most highly developed gyro of the inertial type at the present time is the single degree of freedom miniature integrating gyro (MIG). However, even this remarkably reliable gyro is not a perfectly accurate sensing device. The inaccuracy is due to a number of undesirable torques acting on the gimbal element, about the output axis (OA) of the miniature integrating gyro, which tend to introduce an error signal into the output signal of the gyro. A number of these torques have been isolated by those skilled in the art and include acceleration insensitive torques, acceleration sensitive torques, and acceleration squared sensitive torques.

The miniature integrating gyro has been designed so as to substantially reduce or eliminate these known undesirable torques by means of various compensating techniques. The compensation of all the above-mentioned undesirable torques acting on the gimbal of the MIG results in an extremely accurate instrument. However, requirements of inertial navigation systems and other applications are becoming increasingly exacting and consequently greater accuracy has become mandatory.

The applicant has discovered an additional undesirable, error inducing torque acting on the gimbal element which has heretofore been unknown to those skilled in the art. This torque is referred to by the applicant as the spin motor reaction torque. The applicant has invented means for compensating for the spin motor reaction torque with a resulting increase in accuracy in the gyroscope. It should be noted that since this spin motor reaction torque has been heretofore unknown in the art, there has been no previous attempts to compensate for this torque. There has been a wide variety of prior are directed toward various torque compensating schemes, however, no one has recognized the problem of the spin motor reaction torque.

The spin motor reaction torque arises due to the leakage flux of a spin motor setting up an asymmetrical magnetic flux field about the output axis (OA) of the gyro which reacts with the symmetrical structural configurations of the gyro so as to produce a torque tending to rotate the gimbal about the output axis. In accordance with this invention, the applicant has compensated for the spin motor reaction torque by placing one or more compensating segments within the leakage flux field so as to react therewith to develop a compensating torque to oppose and substantially eliminate the spin motor reaction torque. The amount of compensation is a function of a position of the compensating segment within the asymmetrical flux field. One means of achieving such compensation is to position the compensating segment between the gyro housing and the gyro cover element. A more complete understanding of this invention may be had from the detailed description which follows taken with the accompanying drawings in which:

FIGURE 5 is a view, partially in section, of a floated gyro utilizing an alternate embodiment of the applicant's invention;

FIGURE 6 is a cross-sectional view of the compensating segment of FIGURE 5;

FIGURE 7 is a cross-sectional view of an alternate form of compensating segment;

FIGURE 8 is a schematic representation of the gyro and the compensating segment; and FIGURE 9 is a schematic representation of the leakage flux distribution.

Figure 1:
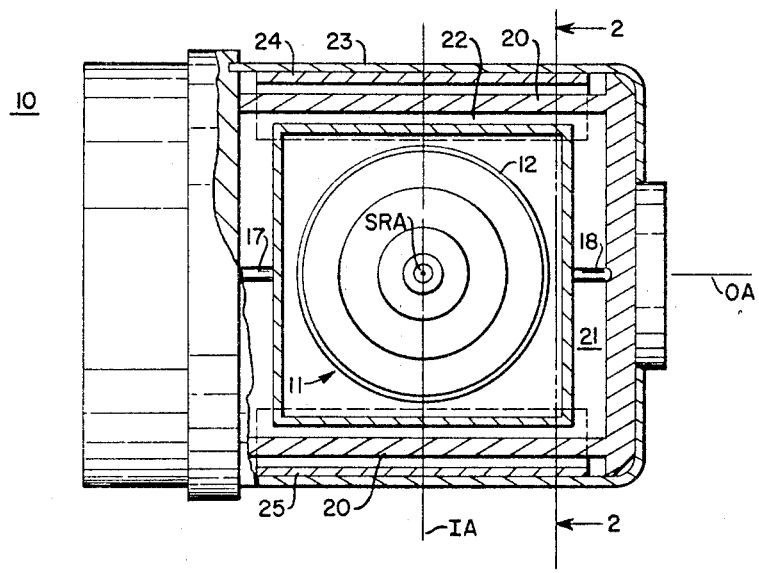
FIGURE 1 is a view, partially in section, of a floated gyro utilizing one form of the applicant's invention.
Figure 2:
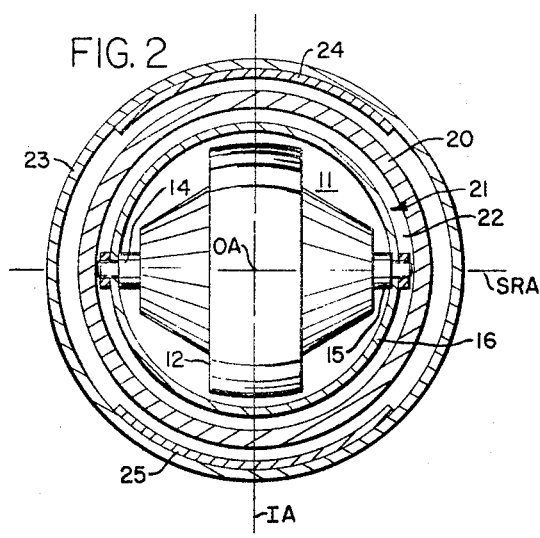
FIGURE 2 is a view of the gyro taken along the line 2—2 of FIGURE 1.

Referring now to FIGURE 1, numeral 10 generally depicts a single degree of freedom floated gyroscope comprising a spin motor 11, including a rotor portion 12, adapted to rotate about an axis identified as the spin reference axis (SRA). The stator portion (not shown) of the spin motor 11 is mounted on suitable trunnions 14 and 15 which are secured by suitable means to a gimbal element 16 (FIGURE 2). The gimbal element 16 is generally cylindrically shaped and is mounted by delicate bearing means 17 and 18 to a generally cylindrical-shaped housing member 20. A viscous fluid 21 is provided inside of the housing 20 and is selected so as to be of substantially the same density as the effective density of the gimbal assembly so as to support substantially all of the weight of the gimbal assembly. The viscous fluid 21 is contained in the gap 22 and as is well understood by those skilled in the art provides the required damping and integrating functions.

A cover element 23 is provided which is generally cylindrical in shape and substantially encloses the housing member 20. The cover member 23 performs the function of shielding the gyro interior from external magnetic fields.

Compensating segments 24 and 25 which will be described fully hereinafter, are disclosed in FIGURES 1 and 2 as rigidly attached to the cover member 23.

Figure 3:
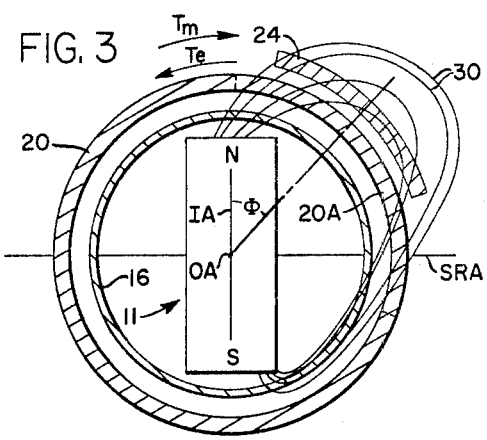
FIGURE 3 is a schematic representation of the gyro and a compensating segment.

The mechanism of the spin motor reaction torque will be explained with reference to FIGURE 3 wherein the gyroscope is schematically represented. The spin motor is identified by reference numeral 11 and is mounted within gimbal element 16. The housing element is identified by reference numeral 20. In addition, the compensating segment 24 is schematically illustrated. A portion of the leakage flux of the gyro spin motor is indicated by the lines encircling the spin motor 11 and is identified by the reference numeral 30. Actually, the leakage flux 30 is three-dimensional in space, but the components shown are those which lie in the plane of the SRA and the input axis, IA (the plane of the paper in FIGURE 3) and which lie to the right of a plane including the IA and the OA as viewed in FIGURE 3. It is believed that by so limiting the representation of the leakage flux 30, the following discussion will be more easily understood. It should be noted that the leakage flux sets up a nonsymmetrical flux field external to the gimbal element. It is clear that should the leakage flux set up a symmetrical flux field, the reaction with the generally symmetrical housing 20 would result in no torque being applied to the gimbal element about the OA, assuming the gimbal and the housing are symmetrically positioned with respect to each other. However, it has been determined by the applicant that the leakage flux is, in fact, asymmetrical. Should the particular portion 20A of the housing 20 intersecting the leakage flux 30 be ferromagnetic, there will be an attraction along the lines of flux attempting to position the portion 20A of housing 20 in a position as close as possible to the nearest pole (North) of the spin motor. This magnetic attraction causes a torque upon gimbal element 16 tending to rotate the gimbal in a clockwise direction about the OA as viewed in FIGURE 3. The sense of rotation is clockwise because the housing 20 is fixed and the gimbal 16 is rotatably mounted. This torque is represented by vector $T_M$.

Figure 4:
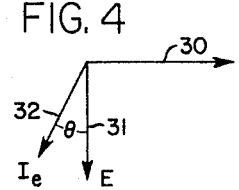
FIGURE 4 is a vector diagram illustrating the relationship of the magnetic flux.

The flux flowing in the housing also induces a voltage (E) 31 proportional to the rate of change of flux, which is 90° out of phase with the leakage flux 30 (FIGURE 4). This induced voltage 31 creates a circular flow of current (eddy current $I_e$) which is perpendicular to the direction of the flux. This results in a magnetic flux 32 in time phase with the eddy currents, a component of which is in phase opposition to the spin motor leakage flux 30. The magnitude of this component of opposing flux is determined by the magnitude of the eddy current $I_e$, and the angle $\theta$ by which it lags the induced voltage 31. The magnitude of the eddy current is determined by the resistivity of the material of portion 20A. The angle $\theta$ is determined by the ratio of inductive reactance to resistance of each elemental path of flux. The torque due to the eddy current, indicated by $T_e$, tends to rotate the gimbal 16 in a counterclockwise direction as viewed in FIGURE 3.

Thus it is clear that there are two spin motor reaction torque (SMRT) components, magnetic and eddy current, which exist in the gyro. Each SMRT component tends to rotate the gimbal 16 in the opposite direction about output axis OA. In practice, it has been determined that the torque acting on the gimbal 16 due to the magnetic component of the SMRT is not equal in magnitude to the opposite acting eddy current component of SMRT. Consequently, a net torque is developed on the gimbal 16 tending to rotate it about its OA. The net torque ($T_{SMRT}$) acting on the gimbal 16 is proportional to the square of the excitation current of the spin motor ($T_{SMRT} = K_2 I^2$). The polarity of the net torque is entirely determined by the type of material through which the flux flows.

In operation, the spin motor reaction torque above explained can be compensated for by placing a segment of a suitable material in the proper position so as to react with the leakage flux and develop a torque acting on the gimbal substantially equal in magnitude and opposite in direction to the SMRT. The segment may be either a ferromagnetic material or a conductive material such as copper. It has been determined that the torque $T_s$ developed by a compensating segment such as segment 24 (due to the interaction of the segment and the leakage flux) is proportional to the square of the excitation current of the spin motor times sine $2\sigma$ ($T_s = K_1 I^2$ sine $2\sigma$). Where $\sigma$ is the angle measured from the IA clockwise to the middle of the compensating segment 24. Except for the sine $2\sigma$ this equation is identical to that for the spin motor reaction torque. Complete compensation requires that:

$$T_s = T_{SMRT}$$
$$K_1 I^2 \text{ sine } 2\sigma = K_2 I^2$$
$$K_1 \text{ sine } 2\sigma = K_2$$

It is clear that if $K_1$ is equal to or greater than $K_2$ complete compensation is possible. It is acknowledged that these equations are not rigorous since the torques are actually proportional to the square of the leakage flux density and it has been assumed that the leakage flux density is entirely a linear function of the excitation current. It is felt that this is a safe assumption in this case as both $T_s$ and $T_{SMRT}$ are effected by the same flux.

Theoretically and experimentally it has been shown that the maximum segment torques are obtained with 90° sections, such as segments 24 and 25, illustrated in FIGURE 2. The length of the segments is not critical as long as the segments are an appreciable part of the gimbal length and are centered over the IA as shown in FIG. 1. The compensating segments 24 and 25 are shown as rigidly attached to the cover element 23 in FIGURES 1 and 2. The compensation technique consists of rotating the cover element 23 until changes in the spin motor current cause no change in gimbal torque $T_{SMRT}$. At this point the torque developed by the compensating segments $T_s$ is equal in magnitude and opposite in direction to the $T_{SMRT}$ and the spin motor reaction torque is completely compensated. When this has been accomplished, the cover element 23 is rigidly attached to the housing element 20 so as to maintain its position relative thereto.

It should be pointed out that there will be a different SMRT developed for each variation of spin motor excitation current, the torque being proportional to the square of the excitation current. However, it should also be noted that the compensation torque is also proportional to the square of the excitation current times the factor of sine $2\sigma$. Since the gimbal element 16 is usually servoed in a closed loop system and the amount of rotation of the gimbal 16 about the OA in response to an input signal is limited to a very small angle, the term sine $2\sigma$ may be considered constant after the original compensation has been achieved. The compensation torque is generated by the same leakage flux that generates the spin motor reaction torque and compensation is complete.

FIGURE 5 discloses an alternate embodiment of the applicant's invention wherein the compensation segment is placed about the output axis OA so as to intersect the leakage flux lying in a plane parallel to a plane defined by the input axis, IA, and the spin reference axis SRA. It will be noted that this particular embodiment utilizes the leakage flux which is contained in a plane at right angles to the plane of the leakage flux intersecting the compensating segments in FIGURES 1 through 3. The elements of FIGURE 5 which are identical to the elements disclosed in FIGURE 1 are referred to by like reference numerals. The cylindrically-shaped boss element 26 is an integral part of the housing member 20. The compensating segment is indicated by the reference numeral 40.

FIGURE 6 discloses a plan view of the compensating element 40. It should be pointed out that the compensating element 40 is a washerlike element comprised of two semi-circular segments, a conducting segment 41 and a non-conducting segment 42. The aperture 46 of the compensating segment 40 has substantially the same diameter as the boss element 26 so that the compensating segment may be positioned around the boss element and attached thereto by suitable means (not shown) when the proper orientation has been determined.

Another embodiment of the compensating segment which may be utilized in the gyro shown in FIGURE 5 is illustrated in FIGURE 7. The compensating element 43 comprises a beveled or tapered conductive washerlike portion 44 and a beveled or tapered non-conductive portion 45 cooperating to form a cylindrically-shaped segment as illustrated in FIGURE 7. The aperture 47 of compensating means 43 has substantially the same diameter as the boss element 26 so that it may be positioned around the boss element and attached thereto when the proper orientation has been determined.

The interaction of the leakage flux and the compensating segment 40 is best explained with reference to FIGURES 8 and 9. The spin motor is indicated by the reference numeral 11, the gimbal by the reference numeral 16, the housing element by the reference numeral 20, and the compensating segment by the reference numeral 40. It should be noted that the axis about which the spin motor reaction torque $T_{SMRT}$ acts, that is the OA, is now lying in the plane of the paper in FIGURE 8. The asymmetrical flux distribution about the OA which is schematically illustrated in FIGURE 9 is indicated by the reference numeral 30. The leakage flux 30 reacts with the housing element 20 in the manner hereinbefore discussed and creates a torque tending to turn the element 16 about the OA. The torque comprises two components, magnetic $T_m$ and eddy current $T_e$, which are indicated as acting in opposite directions in FIGURE 8. Since the theory of the SMRT has hereinbefore been discussed no further discussion will be attempted. The compensating segment 40 is positioned in such a manner about the OA so as to intersect the asymmetrical flux field and develop a compensating torque acting upon the gimbal element 16 so as to substantially eliminate the effect of the SMRT thereon.

Since a portion of the compensating segment 40 is a conducting material and another portion is a non-conducting material it is clear that by rotating the compensating element 40 about the output axis the desired amount of compensation can be obtained. When this has been accomplished the compensating segment is rigidly attached to either the housing element 20 or to the cover element 23. Again it should be stated that the gimbal element 16 is permitted only very limited rotation about the OA due to any input signal. Therefore, once the compensating segment is located relative to the OA, and/or the gimbal element 16, the gyro remains fully compensated.

It should be pointed out that either the compensating segments illustrated in FIGURE 1 or the compensating segment illustrated in FIGURE 5 are effective to compensate the floated gyro so as to eliminate the spin motor reaction torque. It is not necessary that both types of segments be used together. Also it is possible to use an infinite number of shapes and sizes of compensating segments and to position the segments in an infinite number of positions relative to the OA. The applicant does not wish to be understood as limiting his invention only to the compensating segments disclosed.

While I have shown and described specific embodiments of this invention, further modifications and improvements will occur to those skilled in the art. I desire it to be understood, therefore, that this invention is not limited to the particular form shown and I intend in the appended claims to cover all modifications which do not depart from the spirit and scope of the invention.

What I claim is:

1. In a sensitive instrument: an electric spin motor; a gimbal element, said spin motor having leakage flux and being mounted within said gimbal element for rotation about a spin reference axis; housing means; fluid means, said gimbal element being substantially supported within said housing means by said fluid means for rotation about an output axis perpendicular to said spin reference axis, said gimbal element tending to rotate about said output axis in response to spin motor reaction torque; and compensating means mounted on said housing means, said compensating means being positioned so as to interact with said leakage flux of said spin motor and apply a torque to said gimbal means so as to substantially eliminate the rotation thereof due to said spin motor reaction torque.

2. In a floated gyroscope: an electric spin motor; a gimbal element, said spin motor having leakage flux and being mounted within said gimbal element for rotation about a spin reference axis; fluid means; housing means, said fluid means substantially supporting said gimbal element within said housing means for rotation about an output axis perpendicular to said spin reference axis, said gimbal tending to rotate about said output axis in response to spin motor reaction torque; and compensating segment means mounted on said housing means, said compensating segment means reacting with said leakage flux of said spin motor so as to apply a torque to said gimbal element substantially equal and opposite to the torque applied thereto due to said spin motor reaction torque.

3. A sensitive instrument comprising an electric spin motor; a gimbal element, said spin motor having leakage flux and being mounted within said gimbal element for rotation about a first axis; housing means; fluid means, said fluid means contained within said housing means and substantially supporting said gimbal element for rotation about a second axis perpendicular to said first axis; cover means substantially enclosing said housing means, said gimbal means tending to rotate about said second axis in response to spin motor reaction torque; and compensating means, said compensating means being positioned within said cover means so as to apply a torque to said gimbal element due to the interaction of said compensating means and said leakage flux of said spin motor and thereby substantially eliminate the effect of said spin motor reaction torque on said gimbal element.

4. A floated instrument comprising an electric spin motor; a gimbal element, said spin motor having leakage flux being mounted within said gimbal element for rotation about a first axis; housing means; fluid means, said gimbal element being substantially supported by said fluid means within said housing means for rotation about a second axis; said gimbal element tending to rotate about said second axis in response to spin motor reaction torque; and compensating means, said compensating means being positioned so as to intersect said leakage flux of said spin motor and react therewith to apply a torque to said gimbal means tending to oppose and substantially eliminate the rotation thereof due to said spin motor reaction torque.

5. In a floated gyro including an electric spin motor having leakage flux mounted within a gimbal element for rotation about a first axis; a housing member; fluid means substantially supporting said gimbal element within said housing member for limited rotation about a second axis, said gimbal element tending to rotate about said second axis in response to spin motor reaction torque; and a cover element substantially enclosing said housing member and being rigidly attached thereto, in combination with a conductive segment mounted within and attached to said cover member, said segment being positioned so as to intersect with said leakage flux of said spin motor and develop a torque tending to oppose the spin motor reaction torque and substantially eliminate the effect thereof.

6. In a single degree of freedom floated gyro including an electric spin motor having leakage flux mounted within a substantially cylindrical shaped gimbal element for rotation about a spin reference axis; a housing member; fluid means substantially supporting said gimbal element within said housing member for limited rotation about an output axis perpendicular to said spin reference axis; and a substantially cylindrical shaped cover element substantially enclosing said housing member and being rigidly attached thereto, in combination with compensating means rigidly attached within said cover member, said compensating means being positioned so as to intersect with said spin motor leakage flux and develop a force tending to substantially eliminate the rotation of said gimbal element about said output axis in response to spin motor reaction torque.

7. In a floated instrument including an electric motor having leakage flux mounted within a gimbal element for rotation about a first axis; fluid means substantially supporting the gimbal element within a housing member for rotation about a second axis, in combination with compensating means, said compensating means being positioned so as to intersect with said spin motor leakage flux and develop a torque acting on said gimbal element so as to compensate for spin motor reaction torque.

8. In a floated gyro including an electric spin motor having leakage flux mounted within a gimbal element for rotation about a first axis; a housing member; fluid means substantially supporting said gimbal element within said housing member for rotation about a second axis perpendicular to said first axis; and a cover element substantially enclosing said housing member and being rigidly attached thereto, in combination with compensating segment means rigidly attached to said cover member, said segment means being positioned so as to react with said spin motor leakage flux and develop a torque opposing spin motor reaction torque so as to substantially eliminate said spin motor reaction torque.

References Cited by the Examiner
UNITED STATES PATENTS

| | | | |
|---|---|---|---|
| 2,934,961 | 5/1960 | Katz | 74—5.4 |
| 3,074,283 | 1/1963 | Quermann | 74—5.7 |
| 3,077,760 | 2/1963 | Packard | 74—5.4 X |

FRED C. MATTERN, JR., *Primary Examiner.*

BROUGHTON G. DURHAM, MILTON KAUFMAN, *Examiners.*

T. W. SHEAR, P. W. SULLIVAN, *Assistant Examiners.*